United States Patent [19]

Jakel

[11] Patent Number: 5,387,282
[45] Date of Patent: Feb. 7, 1995

[54] STRUCTURAL CEMENTITIOUS COMPOSITION AND METHOD OF MANUFACTURING THE SAME

[76] Inventor: Karl W. Jakel, 3924 Park Pl. #4, Montrose, Calif. 91120

[21] Appl. No.: 78,041

[22] Filed: Jun. 18, 1993

Related U.S. Application Data

[63] Continuation-in-part of Ser. No. 868,846, Apr. 16, 1992, Pat. No. 5,290,355, Ser. No. 876,382, Apr. 30, 1992, Pat. No. 5,323,581, Ser. No. 881,845, May 12, 1992, Pat. No. 5,210,989, and Ser. No. 891,803, Jun. 1, 1992, abandoned.

[51] Int. Cl.$^6$ ................................................. C04B 7/02
[52] U.S. Cl. ........................................ 106/675; 106/698; 106/716; 106/718; 106/784; 106/DIG. 2
[58] Field of Search ................ 106/675, 698, 716, 718, 106/784, DIG. 2; C04B 7/02

[56] References Cited

U.S. PATENT DOCUMENTS

| | | |
|---|---|---|
| 329,513 | 11/1885 | Underwood . |
| 1,469,543 | 10/1923 | Strachan et al. . |
| 1,575,183 | 3/1926 | Sinnett . |
| 2,057,003 | 10/1936 | Bugher . |
| 2,293,744 | 8/1942 | Miles et al. . |
| 2,353,455 | 7/1944 | Gisondi . |
| 2,429,113 | 10/1947 | Warner . |
| 2,450,562 | 10/1948 | Robinson et al. . |
| 2,510,416 | 6/1950 | Pretty . |
| 2,624,298 | 1/1953 | Farren . |
| 2,703,289 | 3/1955 | Willson . |
| 2,715,583 | 8/1955 | Ziegler ............................ 106/675 |
| 2,796,637 | 6/1957 | Miles . |
| 3,783,570 | 1/1974 | Storch . |
| 3,841,885 | 10/1974 | Jakel . |
| 3,852,933 | 12/1974 | Guzzo . |
| 3,852,934 | 12/1974 | Kirkhuff . |
| 3,862,532 | 1/1978 | Markos . |
| 3,870,775 | 3/1975 | Jakel . |
| 3,972,972 | 8/1976 | Yano et al. . |
| 4,131,670 | 12/1978 | Abate . |
| 4,166,749 | 9/1979 | Sterrett et al. . |
| 4,203,456 | 5/1980 | Miller ............................. 106/675 |
| 4,240,840 | 12/1980 | Downing et al. . |
| 4,288,959 | 9/1981 | Murdock . |
| 4,389,359 | 6/1983 | Brunt et al. . |
| 4,407,769 | 10/1983 | Harada et al. . |
| 4,514,947 | 5/1985 | Grail . |
| 4,608,216 | 8/1986 | Barsk . |
| 4,637,860 | 1/1987 | Harper et al. . |
| 4,662,141 | 5/1987 | Miko . |
| 4,663,104 | 5/1987 | Ito et al. . |
| 4,666,648 | 5/1987 | Brittain . |
| 4,673,659 | 6/1987 | Wood et al. . |
| 4,741,131 | 5/1988 | Parker . |
| 4,778,529 | 10/1988 | Barker et al. . |
| 4,778,718 | 10/1988 | Nicholls . |
| 4,781,816 | 1/1988 | Lee et al. . |
| 4,840,672 | 6/1989 | Baes . |
| 4,856,236 | 8/1989 | Parker . |
| 4,914,885 | 4/1990 | Baker et al. . |
| 5,017,232 | 5/1991 | Miceli ............................. 106/711 |
| 5,035,100 | 7/1991 | Sachs . |
| 5,047,086 | 9/1991 | Hayakawa et al. . |
| 5,059,371 | 10/1991 | Saheki et al. . |
| 5,108,679 | 4/1992 | Rirsch et al. . |
| 5,114,617 | 5/1992 | Smetana et al. . |

FOREIGN PATENT DOCUMENTS 0028023 7/1930 Australia .
2245617 1/1992 United Kingdom .

OTHER PUBLICATIONS

Japanese Patent Abstract–Fujiwara et al. "Production of Lightweight Concrete" (Nov. 19 1992) JP 04–331756.
Japanese Patent Abstract–Shimatani et al. "Covering Material For Sprayed Asbestos" (Apr. 13 1990).
Japanese Patent Abstract–Matsuzaki "Heat Insulating Flat Concrete Plate" (Jun. 15 1989).

*Primary Examiner*—Mark L. Bell
*Assistant Examiner*—Paul Marcantoni
*Attorney, Agent, or Firm*—William W. Haefliger

[57] ABSTRACT

A structural article of manufacture having a specific gravity less than about 1.5, composed of a compressed, dry cementitious composition comprising a particulate aggregate substantially free from particles smaller than about minus 80 mesh.

19 Claims, No Drawings

STRUCTURAL CEMENTITIOUS COMPOSITION AND METHOD OF MANUFACTURING THE SAME

This application is a continuation-in-part of co-pending U.S. applications, Ser. No. 07/868,846, filed April 16, 1992, now U.S. Pat. No. 5,290,355, entitled "ROOFING SHINGLE COMPOSITION, METHOD OF FORMULATION, AND STRUCTURE"; Ser. No. 07/876,382, filed April 30, 1992, now U.S. Pat. No. 5,323,581, entitled "LIGHTWEIGHT CEMENTITIOUS ROOFING"; Ser. No. 07/881,845, filed May 12, 1992, now U.S. Pat. No. 5,210,989, entitled "LIGHTWEIGHT CEMENTITIOUS ROOFING, TAPERED AND PROCESSED"; and Ser. No. 07/891,803, filed June 1, 1992, now abandoned, entitled "ROOFING SHINGLE COMPOSITION, METHOD OF FORMULATION, AND FORMATION, all of which are incorporated herein by reference and relied upon.

BACKGROUND OF THE INVENTION

The present invention relates generally to cementitious compositions and certain forming methods to produce structural components therefrom in commercially significant quantities at acceptable rates of production throughout. The present invention relates more particularly to roofing tiles or the like extruded from a combination of very lightweight and lightweight aggregate, Portland cement composition, with or without fiber reinforcement and cured to possess a substantially reduced density without unacceptable loss of engineering strength or integrity. This invention is broadly applicable to other structural forms where weight savings are required and to other methods of manufacture where the economies realized through extrusion are not paramount.

Cement, and particularly Portland cement, has long been an engineering material of choice for a wide variety of structural components. Mixed with aggregate, such as sand and stone, concrete is probably the most commonly used building material ever employed. Concrete constituents of cement and aggregate are copious and relatively inexpensive. Their abundance is augmented by their ready availability throughout the world. These factors have contributed to the popularity of concrete as a standard building material. Consequently, perhaps no building compositions have been more studied or better understood than cement and concrete. Yet, despite considerable study at the theoretical level, actual production of building components is still largely more art than science.

The formability of concrete has led to its adaptability as a structural building material. Through the controlled addition of varying types and amounts of aggregate, concrete has been employed in literally hundreds of different shapes or forms in the building trades, from cast or block foundations to roofs, with scores of application in between. The present invention is primarily (but not exclusively) concerned with cement-based roofing materials, such as tiles or shakes, and therefore greater emphasis will be placed on these applications; though those skilled in the art will understand from the ensuing discussion how these principles are applicable to a host of other applications as well.

Despite the widespread popularity of cement as a building composition, its use as an effective roofing composition has been hampered and has not seen parallel adoption as, for example, when compared with foundations, walls or floors. There have been successful instances of its use for roofing tiles, especially in Europe, dating back as long as 100 years. However, those earlier attempts were based on manual production; each tile was essentially handmade for its specific application. Then too, those earlier efforts typically adopted cement compositions otherwise formulated for standard concrete forms; there was little or no consideration given to specific compositional variations to achieve weight savings.

The last 100 years have seen continuing interest in the use of cement as a structural composition for roofing materials. Many different suggestions have been made with this goal in mind. None has been entirely successful, in providing a cementitious roofing material having adequate strength which can be produced economically.

The prior art recognizes the need to reduce the weight of normal concrete mixes when forming roofing tiles or the like. The specific gravity of concrete is about 2.1–2.2. This is too heavy to be practical for many roofing applications. Thus, the art has adopted the use of lightweight aggregates to replace stone and sand conventionally used in concrete mixes. This substitution of materials allows producers to achieve densities in the range of about 1.6. Then, based on specific design configurations, roofing materials in the range of 6.5 to 7.0 pounds per square foot installed weight can be achieved. This is about 70% the weight of standard concrete roofing materials.

The use of lightweight aggregates alone cannot, however, yield a product having adequate engineering integrity without strict process controls. Usually these products are cast in forms or molds having the desired configuration for the finished tile. Unlike conventional concrete mixes, concrete with lightweight aggregate require dewatering and then curing under pressure to compact the aggregate and, thus, maintain its physical integrity during the curing process. Otherwise, two problems arise which diminish the strength of the finished product. As excess water evaporates during cure, voids remain which impair strength. Also, the very light aggregates, such as expanded Perlite, have a pronounced tendency to "spring back" after forming pressure removal and during cure, which not only can distort the product but will diminish cured strength as well. Curing under pressure eliminates these problem sources, all other variables being equal.

Casting lightweight aggregate cement and dewatering under pressure can lead to acceptable products in terms of strength and integrity. However, that process is slow and cumbersome. It is not suited to large scale production with minimal waste or defect rates. Conventional extrusion is better adapted for these purposes.

Concrete extrusion is a well known production technique. Though it works well when producing conventional concrete products using conventional concrete formulations, it has heretofore been impractical as a production technique for forming roofing tiles or the like from very lightweight aggregate. Except under laboratory or small scale production conditions, extrusion has proved too sensitive to variations in water content of the mix and the resultant product remains susceptible to spring back and attendant degradation in physical properties.

In consequence of the foregoing, it is apparent that there has been a long felt but unfulfilled need to develop a lightweight roofing product, having a specific gravity less than one half that of concrete. But the art has searched unsuccessfully for more than simply weight savings, the products heretofore elusive must also possess acceptable engineering strength and integrity. Moreover, products of this sort must be economical, which demands commercial scale production with acceptable rates of productivity (i.e., capable of modern manufacturing at the so-called "zero-defect" level).

SUMMARY OF THE INVENTION

The present invention meets the long felt needs of the industry. In accordance with one aspect of the present invention, a lightweight cementitious structural product, such as a roofing tile, is produced having a specific gravity in the range of from about 0.7 to about 1.5 and a compressive strength of about three-fourths that of conventional concrete. The improved products of the present invention exhibit structural and environmental integrity comparable to conventional concrete. Improved methods of manufacturing the unique products of this invention permit commercial scale production by various standard techniques, preferably by extrusion but also through such conventional processes as compressive forming of the type associated with paver and block production and also classic casting. High scale production is achieved in accordance with the present invention with historically unattainable levels of quality to match the improvements in the increased level of machine throughput. These advantages are particularly attainable in Portland cement and lightweight aggregate mixes based on lightweight aggregate, such as pumice, expanded shale or clay and very lightweight aggregate such as expanded Perlite, compositions which could not be formed in these ways prior to development of the present invention.

The foregoing and other advantages of the present invention are realized in one aspect by a unique control of the physical morphology and distribution of the constituents, and especially the aggregate constituents, of the cement mix. In this context, it has been determined that particle size and distribution of the lightweight aggregate must be controlled within a prescribed range. The particle size distribution curve of lightweight aggregate additions desirably has a maximum in the range of from about 16 to about 50 mesh, wherein at least about 66% of the particles fall within that range. The mix is controlled to be substantially devoid of the small particles which inhibit if not preclude the realization of controlled dimensional stability in the green product, particles determined to be less than about minus 80 mesh. In this context, substantially devoid connotes less than 10% of the mix in these smaller particle sizes, preferably less than about 6% and most preferably less than about 2-5%.

In another aspect of the present invention, production methodology is vastly improved by presoaking or prehydrating hydrophilic aggregate constituents. It has been determined that certain aggregates are sufficiently water loving that their introduction to the mix without such pretreatment will result in their scavenging water from other constituents, thus creating an imbalance in water distribution throughout the mix. This leads in turn to problems in formation, especially by extrusion, which are overcome by the prescribed presoaking treatment.

In summary, therefore, three points warrant emphasis and understanding. One aspect concerns distribution of aggregate with particular attention paid to particulate size. Another concerns the blending of lightweight and very lightweight aggregate. Lastly, in a third aspect, one needs to pay heed to prehydration of certain aggregate. The resultant advantages and other aspects of the present invention will become apparent upon examination of the following detailed description of preferred embodiments which explains in greater detail the essential elements summarized above.

DETAILED DESCRIPTION

The present invention relates generally to structural articles made from cementitious compositions, such as Portland cement and aggregate compositions and, more especially, to structural articles made from cement compositions including lightweight aggregate such as pumice, expanded shale or clay, wood chips, very lightweight aggregate such as expanded Perlite or exfoliated Vermiculite and mixtures thereof. The present invention is particularly adapted to the cost efficient manufacture of roofing materials from these cement compositions having a finished or cured density on the order of one half or less the density of conventional concrete but with greater retention in strength. The present invention also relates to improved methods of manufacturing these structural components, notably extrusion methods although certain compressive forming, slurry dewatering or wet casting processes are also deemed within the scope of these improvements. Thus, despite the fact that the following detailed description will tend to focus on the extrusion of roofing tiles or the like, those skilled in the art will readily appreciate that this description is meant to be exemplary and not limitative.

The most preferred implementation of the present invention concerns the extrusion of a dry, Portland cement composition specially formulated in several important aspects to form a roofing tile having a specific gravity of less than about 1.4. As used herein, the term "dry" when applied to these compositions refers to the physical attributes of the admixture of Portland cement and aggregate prior to forming. As those skilled in the art know, Portland cement must be hydrated to cure and, therefore, sufficient water of hydration must be added if the material is to produce a useful product. Accordingly, "dry" in this sense does-not mean anhydrous. However, most cement formulations include water in excess, and typically vastly in excess, of that necessary for complete hydration of the cement constituent. Thus, it is customary to observe Portland cement compositions which are sufficiently fluid to be flowable even in the absence of mechanical working, such as vibration. In contrast, the "dry" formulations of the present invention (when such reference is made either in this specification or in the appended claims) have sufficient water to ensure complete hydration of the cement binder but insufficient water to permit unassisted flow. This state can be determined by manually compressing a small quantity of the cement mix, about the size of a baseball, with sufficient force for the material to assume that shape. Upon release of the forming pressure, the material will remain agglomerated as a ball and have enough water content to be shape sustaining in the spherical form. But there will be insufficient water to be expressed from the mass to the hand of the person squeezing the material into shape—his hand will feel "dry" when he puts the ball down. Following the examples given hereinafter, those skilled in the art will be able to ascertain the proper degree of hydration of the overall mix, guided by the foregoing principles and understand what is meant by the term "dry" as applied to these compositions.

Those skilled in the art also understand that the term "Portland Cement" may connote a number of different compositions. Among these are included Type II Common, Type III High Early and Type C Plastic. This use of the generic term, "Portland Cement, " herein is meant to include all of these species.

The most preferred structural article to be formed in accordance with the present invention is a roofing tile. For the sake of convenience, the term "tile" is used herein in the most expansive manner and is meant to include other conventional roofing shapes. Thus, the term "tile" is meant to include such physical forms as the familiar flat tile, tiles with integral water channels formed along an edge thereof, "S"-shaped tiles, shakes or shingles without water channels and other similar configurations used in roofing residential or commercial buildings.

The procedures described herein produce lightweight cement components having on the order of one-half the density of standard concrete, or less, but with structural strength about three-fourths that of concrete. Therefore, these products are not limited to use in roofing. Being lightweight, strong, fireproof and environmentally resistant, the components made using the formulations and procedures described hereinbelow can also be used effectively in many other structural or nonstructural applications calling for these attributes. Among those for which the present invention is best suited are pavers, bricks, blocks, siding, facings and the like.

The present invention provides the first formulation and production technique to permit effective extrusion of lightweight aggregate Portland cement compositions on a commercial scale. In this general context, the preferred cement compositions include at least one, and preferably two, lightweight aggregates. The first is one having a density in the preferred range of from about 27 to about 50 pounds per cubic foot and the second is considerably lighter, having a density of about 6 to about 10 pounds per cubic foot (sometimes considered an "ultralight" aggregate by workers in the art). Examples of the former, heavier aggregate include pumice, expanded shale (sometimes referred to in the art as "clay") and wood chips; examples of the latter, lighter material is expanded Perlite. Though vermiculite may also be considered within the scope of those materials classified as very light, it's cost and availability render it an unsuitable candidate at the time this invention was made, but due to economic rather than technical reasons. Likewise, scrap or waste foamed polymer, such as foamed or expanded polystyrene or polyurethane, could be substituted or added as the very lightweight constituent, and if so with particulate size of about plus 30 mesh.

As used herein, the term "expanded shale" refers to a prepared product which, due to its method of preparation, is fine, friable and highly hydrophilic. This type of product is derived from shale or clay which undergoes calcining and crushing operations. Generally, the mined raw material is first brought to a proper degree of hydration to be extruded. Sometimes the naturally occurring product has the required water content, other times it must be adjusted by additions or by removal. The mined product is milled to create a uniform blend and then extruded under high pressure through small diameter holes in an extrusion plate to form rods. These rods are calcined while retaining water to create expansion and fracturing, thus yielding a porous, hydrophilic material. When required, this material is further crushed and screened to produce aggregate. Other compositions having the same or comparable physical properties, especially density, are considered suitable substitutes inasmuch as these constituents are nonreactive in the concrete mix.

Heretofore, attempts to extrude these cementitious compositions lacked adequate process control to manufacture roof tiles without unacceptable loss of quality in commercial quantities. Substantial percentages of throughput were waste because the products lacked adequate strength for their intended purposes. The present inventor has determined that there are three heretofore unrecognized problem sources which have stymied prior art workers.

One of these problems is referred to herein as "springback." This relates to a form of dimensional instability in the uncured or green cement product which accompanies the release of pressure on the composition after the forming step, such as that which is normal in extrusion or other compressive forming techniques. This instability is attributed to dimensional changes in the aggregate particulate, resulting in a pronounced tendency of the material to "spring back" once pressure is removed. Because cement has virtually no modulus of elasticity, these macro scale dimensional changes in the post-formed but precured product reduces bond integrity and leave, as a consequence, a product with unacceptable engineering strength.

The second problem recognized by the present inventor deals with the sometimes acute water sensitivity of both the cementitious mix and the extrusion or pressing machines typically used to form roofing tiles and other shapes. Water control has been identified as a process variable of immense importance in this environment. That has proven problematic in light of the hydrophilic character of some of the aggregate materials employed in the admixtures of the present formulations. A particularly troublesome problem source has been identified as the tendency of hydrophilic aggregate to scavenge water from the mix and from other constituents in it, depleting water content on a micro scale over time as these water loving constituents draw moisture from their surroundings. This has been found to be a problem compounded by machine operators who have historically adjusted water content in the mix to produce a familiar sheen on the extruded or pressed product, because the overall water content of the mix remains constant on a macro scale (discounting slight evaporative losses in these relatively short time spans). Thus, as water distribution changes due to take up by hydrophilic constituents, the products appears to have less sheen and the operator's typical response is increasing mix moisture to restore appearance; but that leads to excess water content and a product which statistically will be inferior. Then too, even in a continuous process, one may not always discount evaporative losses between mixing and extruding, contributing to or compounding this "water problem."

The third problem recognized deals with lack of "compactability" that lightweight and very lightweight aggregate mixes exhibit. These mixes typically resist being compacted to the levels required for acceptable compressive tensile and flexural strength.

Having identified these heretofore elusive problems, the present inventor has developed specific solutions to overcome them. Each is described in detail below.

The springback and lack of compaction phenomena has been determined to be a strong function of aggregate type and particle morphology. To overcome this problem, particle size and particle size distribution have been identified as crucial variables which must be measured and monitored to extrude a roofing tile of adequate engineering strength; i.e., a strength sufficient to allow the tile to serve its intended purpose for a commercially acceptable service life. Too many particles larger than the threshold specified herein will tend to create voids in the compacted product thus reducing strength. More importantly, and a factor not previously understood, too high a concentration of small particles will prevent effective extrusion of a product having acceptable strength. In this latter case, the small particles will tend to "use up" the cement and also create large areas of small particles which resist compaction. Proper amounts of small particles will fill the interstices naturally occurring in the particulate mix. By settling into those interstices, the aggregate takes on the appearance of fewer larger particles because several adjacent particles have the void spaces between them filled with small particles. This, in turn, eliminates springback and aids compaction resulting in acceptable strength in the finished product.

It has now been determined that specific control over the particle sizes and their distribution is essential to acceptable results. Generally, the aggregate particles for all types of aggregate in the mix of this invention desirably have a particle size distribution curve which exhibits a maximum in the range of from about 16 to about 50 mesh. Furthermore, at least 66% of the particles in the aggregate desirably will fall within this same range. (As described herein, when mesh size is referenced, unless otherwise specified, the measurement is a minus mesh description, referring to material which falls through the screen to smaller mesh screens.) Moreover, the mix should be substantially devoid of particles smaller than about 80 mesh. In this context, substantially devoid is meant to connote a slight tolerance for these small particles, up to an amount which qualitatively corresponds to the threshold of springback. That is, the present invention tolerates a sufficient quantity of small particles or fines below which springback is not observable, but no more as any greater quantity will ruin the finished product. Inasmuch as this factor has been empirically determined, those skilled in the art may need to perform a few rudimentary tests to ascertain the precise onset of springback or dimensional instability and adjust their machinery and product formulations accordingly. However, guided by these qualitative specifications, those skilled in the art will readily locate the proper operating parameters. Quantitatively, there should be less than about 10% of these smaller particles in the mix for acceptable results, preferably less than 6%, and optimally not more than about 2-5%. Practically speaking, it is not feasible to eliminate all fines, for reasons described below, but that has not proven to be an impediment to acceptable results if particle size distributions are maintained in the ranges specified herein.

The following tables specify the preferred ranges for particles of aggregate and also their distribution.

When the Pumice or expanded shale or clay as received is dried to less than 1% moisture content and then screened to create a material having the following sieve analysis expressed in percent by weight retained on screen, the most preferred distribution is as follows:

| | |
|---|---|
| 4 mesh | 0-5 |
| 8 mesh | 10-20 |
| 16 mesh | 20-30 |
| 30 mesh | 30-50 |
| 50 mesh | 5-15 |
| Pan | 5 max. |

This material has a specific gravity of 0.80-0.90 and weighs 40 to 50 lbs/ft$^3$.

When the expanded Perlite is screened (before or after expansion), the following sieve analysis expressed in percent by weight retained on the screen is most preferred:

| | |
|---|---|
| 8 mesh | 0-7 |
| 16 mash | 30-40 |
| 30 mesh | 25-35 |
| 50 mesh | 15-25 |
| 80 mesh | 0-6 |
| Pan | 2 max. |

This material has a specific gravity of 0.13-0.17 and weighs 7 to 11 lbs./ft$^3$.

Proper storage and handling of these aggregates are essential if the benefits of the present invention are to be realized. These aggregate materials are friable. Thus, it is virtually impossible to exclude all particles smaller than 80 mesh; the production and screening process will create fines. Moreover, even having taken proper precautions to screen out particles outside the prescribed range, subsequent storage and handling may convert an acceptable aggregate admixture into an unacceptable one. Furthermore, proper handling demands the need for attention in the mixing process as well, because these friable materials are susceptible to degradation at that time too.

Water control has been determined to be an equally important variable in producing satisfactory quality roofing tiles, especially by extrusion. On the one hand, extrusion equipment has a pronounced tendency toward water sensitivity. An extrusion mix having either too much or too little water cannot properly be forced through the extrusion die(s) to yield an adequate uncured product. On the other hand, and even more pronounced, the mix itself is highly susceptible to water content, on both macro and micro scales. Those skilled in the art have long recognized the importance of proper water control but have not adequately appreciated certain dynamics.

It has been determined in accordance with the present invention that water control is attained and balanced by specific pretreatment of the highly hydrophilic aggregates. This pretreatment takes into account two particular variables important to quality production, degree of hydration and lag time in production.

Most lightweight aggregates are hydrophilic, some to considerable extent. While very lightweight aggregates are also hydrophilic, Perlite has a relatively rapid water takeup. Contrariwise, aggregates like pumice and especially expanded shale are both highly water loving but take up water of hydration much more slowly. The present inventor has ascertained that admixtures of these constituents, when added under customary conditions of only slight degrees of hydration (dictated primarily by relative humidity), do not extrude properly because highly hydrophilic constituents scavenge available water from other constituents. While total water content remains constant, its distribution in the mix leaves too little available for binding the entire aggregate upon extrusion-the mix responds as if too dry to maintain adequate green strength.

This problem is overcome by pretreatment of the hydrophilic aggregate, particularly the pumice and expanded shale constituents, to ensure a sufficient degree of hydration prior to admixture with the remaining constituents that adequate green strength is attained in the uncured, extruded product. In accordance with the methods of the present invention, it is optional to prehydrate Perlite aggregate because of its lower hydrophilicity, but mandatory to prehydrate such highly hydrophilic constituents as pumice and expanded shale. Were other aggregates to be included, those skilled in the art would readily be able to determine whether and to what extent prehydration should or must be provided by comparison to the materials described herein and by simple test procedures.

Insofar as the kinetics of cement hydration and cure are complex and studied more empirically than theoretically, the present inventor has determined a workable interrelationship between the degree of initial hydration of hydrophilic aggregate and dwell time before formation. Generally, in a continuous process in which the completely mixed composition is promptly delivered to the extrusion head, the degree of aggregate hydration is desirably greater than 50%, preferably greater than 75% and most preferably greater than 90%. In a batch process, susceptible of both evaporative losses as well as exacerbated effects due to water scavenging, it is preferred that the hydrophilic aggregates be pretreated to a degree of hydration of at least 80% and more preferably greater than about 90%. Furthermore, batch processed cement mixes desirably are delivered to the forming equipment sooner than 30 minutes from mixing, preferably sooner than 20 minutes and most preferably sooner than about 2-15 minutes. Accordingly, it becomes important to balance the production of the green mix with the throughput of the forming equipment. This coordination of production variables is well within the skill of the art now that the artisans appreciate the importance of this factor in manufacturing products having acceptable quality.

In solving the problems associated with the extrusion of lightweight cement products, it was determined that careful and specific control of both particle size/distribution and water content/distribution also improves the properties of similar cement products produced either by compressive forming or casting. Therefore, the same controls on aggregate particles and water content have resulted in improved products produced on paver equipment. Paver equipment utilizes a vertical press to form the product and the same dry mix used in extrusion forming equipment disclosed above may also be used without modification in paver machines. By adding slightly more water to the mix to permit flow, the composition can also be cast. However, unlike conventional cast products, closer control on particle size and distribution has resulted in a unique composition which yields higher quality cured products. Also, much greater amounts of water may be added to produce a slurry which can be dewatered and pressed using Fordrinier or Hatchek type equipment familiar in the industry resulting in higher quality products than formerly possible.

Products made in accordance with the present invention have the distinct advantage of low weight due to the use of low weight aggregate. Density can be tailored by judicious selection of lightweight and very lightweight aggregates and appropriate compositional limits. The designer is thus able to make products having a specific gravity in the range of about 0.5 to about 1.5, preferably in the range of about 0.7 to about 1.4 and most preferably in the range of about 0.8 to about 1.1. This compares favorably with standard concrete used to form the same shapes, but with a specific gravity on the order of 2.2. It is also important to note that products produced in accordance with the present invention can be made buoyant as opposed to conventional concrete products. Some reduction in strength accompanies the lower density, but the loss in strength is not as substantial. In most cases, strengths about three-fourth that of concrete may be realized, leaving the resultant product structurally sound for many construction applications.

The techniques for mixing ingredients is the same generally as for conventional concrete products and standard concrete mixers may be used. However, when fibers of any sort are included in this mix, as in conventional mixes, the method used to distribute the fibers uniformly throughout the mix must be adjusted in order to assure that the very lightweight aggregates are not degraded by a violent mixing action.

Standard concrete curing methods used for extruded, pressed, cast or dewatered conventional concrete products may be used. The preferred method is the use of elevated temperatures up to 160 degrees fahrenheit with humidity controls to insure that the product does not dry out so much that the Portland Cement hydration is stopped. Standard curing methods may be used with this new formula when using fiber also. It should be noted, however, that when cellulose fibers are used the curing time may increase.

EXAMPLES 1-5

It has been found by the present inventor that this new formulation results in a concrete which acts and reacts identically to conventional sand concrete. This means that the use of common concrete processing techniques and the use of additives commonly used and known by the cast concrete industry, including, but not limited to, mixing methods, use of plasticizers and water reducing additives, use of organic and inorganic fibers and the use of curing methods and accelerators will result in the same increases in strength, processability, and performance enhancement as would be expected by it's conventional concrete equivalent.

Examination of the formulas and test results as shown in the following table reveals that formula changes and methods of forming used to shape the product affect the strength and water absorption results. However, the changes or improvements are only at levels that would be expected for any concrete product and are clearly not necessary when performance results for a given product do not need to be extraordinary. The performance results for the invented formulation which does not use any special mixing, additives, fibers or curing processes are more than adequate to produce most known lightweight products.

|  | Ratio Mat'l: PC Design | Lbs. Design | Formulas (by weight) | | | | |
|---|---|---|---|---|---|---|---|
| MATERIALS |  |  | Example #1 Extruded Actual | Example #2 Extruded Actual | Example #3 Extruded Actual | Example #4 De-watering Press Actual | Example #5 Press (paver) Actual |
| Portland Cement | 1 | 29.70 | 32.00 | 35.00 | 29.70 | 18.00 | 25.10 |
| Shale (25% water content) | 1.2 | 35.64 | 38.00 | 37.40 | 35.10 | 20.00 | 13.30 |
| Perlite (expanded) | 0.42 | 12.47 | 14.30 | 11.20 | 11.74 | 6.80 | 19.80 |
| Polyester | 0.006 | 0.18 | 0.19 | 0.31 | 0.00 | 0.15 | 0.00 |
| Cellulose | 0.025 | 0.74 | 0.51 | 0.84 | 0.00 | 1.50 | 0.00 |
| Plasticizer | 0.008 | 0.24 | 1.27 | 0.00 | 0.40 | 0.00 | 1.00 |
| Stearate | 0.01 | 0.30 | 0.00 | 0.00 | 0.00 | 0.18 | 0.00 |
| Calcium Chloride | 0.04 | 1.19 | 1.17 | 1.29 | 0.00 | 2.00 | 1.00 |
| Portion 1 H2O | 0.2 | 5.94 | 12.70 | 14.00 | 9.00 | 35.00 | 17.10 |
| Portion 2 H2O | 0.47 | 13.96 | 0.00 | 0.00 | 0.00 | 0.00 | 0.00 |
| Total H2O | 0.67 | 19.90 | 12.70 | 14.00 | 9.00 | 35.00 | 17.10 |
| Total Weight (incl water) |  | 100.36 | 100.14 | 100.04 | 85.94 | 83.63 | 77.30 |
| Machine used/pieces per min. |  |  | Burlingame/90 | Powell/40 | Vortex-Hydra/10 | Fordrinier/44 | Flemming/20 |
| Curing, time/temp./humidity* |  |  | 8 hrs./120/85% | 24 hrs./100/70% | 4 hrs./130/95% | 8 hrs./120/85% | 8 hrs./110/70% |
| Specific Weight (cured) |  |  | 1 | 1.25 | 1.15 | 1.1 | 0.9 |
| Water absorption (% dry weight) |  |  | 26 | 30 | 17 | 15 | 32 |
| Compressive Strength (psi avg.) |  |  | 3495 | 3750 | 4010 | 3300 | 3000 |
| Tensil Strength (psi avg.) |  |  | 790 | 830 | 710 | 700 | 890 |

*Initial demolding stage cure. Tests conducted on samples after 28 days of ambient storage cure.
Example #1: Extruded with standard formulation with known concrete additives. No stearates used. Light weight with good strength characteristics.
Example #2: Extruded with less Perlite and resultant higher weight. Stronger yet with higher water absorption due to no Plasticizer.
Example #3: Extruded with no fibers, no calcium chloride but with plasticizer to aid extrusion results in good strength and compaction. Lower water absorption values.
Example #4: Formed by de-watering process. Uses stearates to reduce water absorption values to conventional concrete levels.
Example #5: Formed by pressure and vibration. No fibers used. Lower strengths due to lower compaction of forming process.

Formulas (analysis weight vs. volume)

| MATERIALS | WEIGHT | | | | VOLUME | | | |
|---|---|---|---|---|---|---|---|---|
|  | Ratio to cement | Lbs. | Ratio to total wt. | % total wt. | Ratio to cement | Cu. Ft. | Ratio to total vol. | % total volume |
| Portland Cement | 1.00 | 32.00 | 0.38 | 37.96% | 1.00 | 0.32 | 0.09 | 9.16% |
| Shale (25% water content) | 1.19 | 38.00 | 0.45 | 45.08% | 2.47 | 0.79 | 0.23 | 22.65% |
| Perlite (expanded) | 0.45 | 14.30 | 0.17 | 16.96% | 7.45 | 2.38 | 0.68 | 68.19% |
| Total aggregates | 1.63 | 52.30 | 0.62 | 62.04% | 9.92 | 3.18 | 0.91 | 90.84% |
| Total |  | 84.30 | 1.00 | 100.00% |  | 3.50 | 1.00 | 100.00% |

Comments: Typical conventional concrete ratios of aggregates to cement by both weight and volume is 3:1. Light weight aggregates (shale) only ratios are typically 1.5:1 (wt.) and 2:1 (vol).

It has also been found by the inventor that when using extrusion and paver-block forming machines which have been set up for conventional concrete production, that improvement in compaction may be obtained by readjusting compression settings to take into account the slightly different compressibility of the invented mix. The compression amount is slightly more than with conventional concrete.

The invention has now been described with reference to certain preferred embodiments and exemplified with respect thereto. However, those skilled in this art will readily appreciate that various substitutions, modification, changes and omissions may be made without departing from the spirit thereof. Accordingly, it is intended that the scope of the present invention be limited only by the scope of the following claims, properly interpreted with respect to all available equivalents.

I claim:

1. A structural article of manufacture having a specific gravity less than about 1.5, composed of a compressed, dry cementitious composition comprising a particulate aggregated free from particles smaller than about minus 80 mesh, said composition comprised of Portland cement and an aggregate containing perlite and an additive selected from the group consisting of pumice, expanded shale and mixtures thereof, the weight ratio of aggregate to cement being greater than about 1.3 and less than 1.9.

2. The article of claim 1, wherein the particle size distribution curve of said aggregate has a maximum in the range of about 16 to about 50 mesh and at least 66% of said aggregate has a particle size in said range.

3. The article of claim 1, in the form of an extruded structural component.

4. The article of claim 1, in the form of a compressively pressed structural component.

5. The article of claim 1, having a specific gravity less than about 1.4.

6. The article of claim 1, having a specific gravity less than about 1.1.

7. The article of claim 1, having a specific gravity in the range of from about 0.5 to about 1.5.

8. The article of claim 1, having a specific gravity in the range of from about 0.7 to about 1.4.

9. The article of claim 1, having a specific gravity in the range of from about 0.8 to about 1.1.

10. The article of claim 1 wherein said article is formed by extrusion of said composition, said aggregate is selected from the group consisting of hydrophilic pumice, expanded shale and mixtures thereof, and said aggregate is pretreated with and contains water to hydrate the same to a degree sufficient to prevent said hydrophilic aggregate from scavenging water from other constituents of said cementitious composition prior to said extrusion and thereby prevent depletion of sufficient free water content to permit extrusion.

11. The article of claim 10, wherein said aggregate has a degree of hydration of at least 75%.

12. The article of claim 10, wherein said aggregate has a degree of hydration of at least 90%.

13. A cementitious mix of Portland cement and a lightweight aggregate specifically adapted for extrusion of a product having a specific gravity of less than about 1.5, the improvement comprising an aggregate particulate blend devoid of particles smaller than about minus 80 mesh to create dimensional instability in the extruded, uncured product thereby precluding springback, the mix aggregate including shale and Perlite, the weight ratio of aggregate to Portland cement being greater than about 1.3 and less than about 1.9.

14. The mix of claim 13, wherein the constituents of said blend are selected from the group consisting of Perlite, pumice, expanded shale and mixtures thereof.

15. A cementitious admixture of a Portland cement binder and an aggregate blend, adapted for forming a structural component having a specific gravity less than about 1.5 by any one of extrusion, compression forming or casting, wherein said aggregate blend is comprised of a first, lightweight aggregate constituent having a density in the range of from about 27 to 50 pounds per cubic foot and a second, ultra-lightweight aggregate constituent having a density in the range of from about 6 to about 10 pounds per cubic foot, which aggregate constituents are present, relative to the weight of said cement, in the proportions of about one part lightweight aggregate and about one half part ultra-lightweight aggregate, the aggregate including shale and Perlite, the weight ratio of aggregate to Portland cement in the admixture being greater than about 1.3 and less than 1.9.

16. The admixture of claim 15, wherein the particle size distribution curve of said aggregate blend has a maximum in the range of from about 16 to about 50 mesh and at least 66% of said aggregate has a particle size within said range.

17. The admixture of claim 16, wherein said lightweight aggregate is selected from the group consisting of pumice, expanded shale, wood chips and mixtures thereof.

18. The admixture of claim 17, wherein said ultra-lightweight aggregate is Perlite.

19. A structural article of manufacture having a specific gravity in the range of from about 0.5 to about 1.5 composed of a compressed, dry admixture of Portland cement and an aggregate blend comprising a first aggregate constituent selected from the group consisting of pumice, expanded shale and mixtures thereof and a second aggregate constituent of Perlite, wherein said aggregate blend has a particle size distribution curve with a maximum in the range of from about 16 to about 50 mesh with at least 66% of particles within said range, the weight ratio of aggregate to cement being greater than about 1.3 and less than 1.9.

* * * * *